Nov. 12, 1963  KOKUJI TAKEHARA  3,110,209
FIBER FEEDING AND CUTTING DEVICE
Filed Oct. 9, 1958  2 Sheets-Sheet 1
Fig. 1,
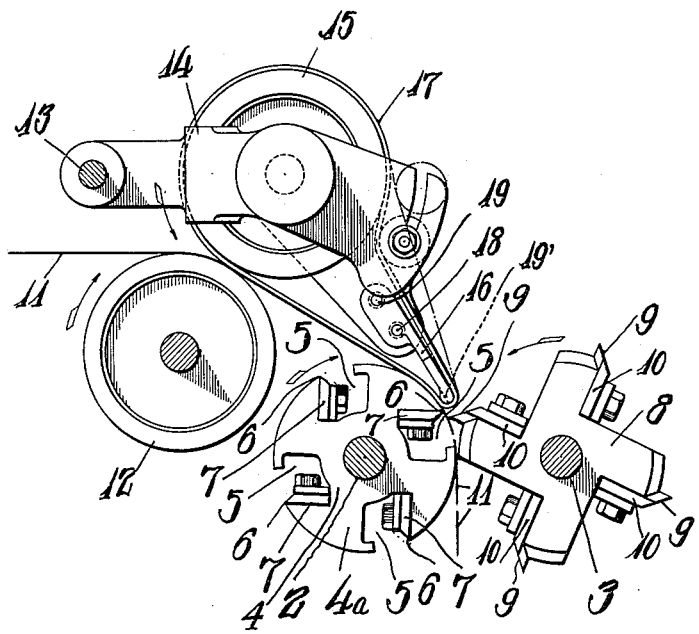
Fig. 2,
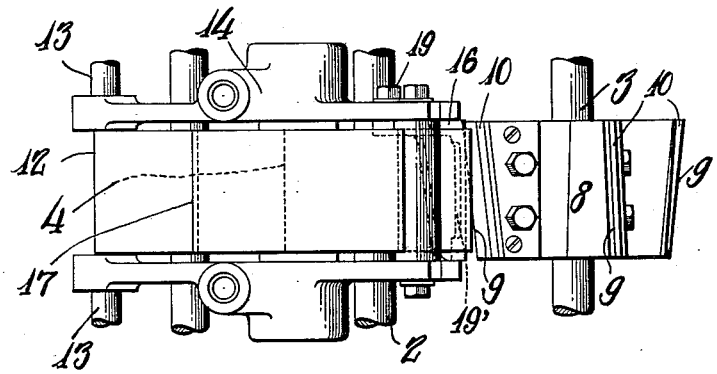
INVENTOR.
Kokuji Takehara
BY
Wenderoth, Lind & Ponack
Attys

United States Patent Office 3,110,209
Patented Nov. 12, 1963

3,110,209
FIBER FEEDING AND CUTTING DEVICE
Kokuji Takehara, 20/22 Muko-Machi, Oaza, Kaede-Koaza-Inaba, Otokuni-gun, Kyoto, Japan
Claims priority, application Japan Oct. 19, 1957
Filed Oct. 9, 1958, Ser. No. 766,227
4 Claims. (Cl. 83—322)

The present invention relates to a fiber cutting device, and more particularly to a device for cutting bundles of fibers so that the fibers in the bundles are in short lengths.

It is an object of the present invention to provide a fiber bundle cutting device in which the fiber bundle is fed steadily and accurately to a point between two rotating cutting blades so that the fiber bundle is cut by the blades in a scissor-like manner.

It is a further object of the present invention to provide such a fiber bundle cutting device which comprises a transversely severing pair of adjacent rollers mounted for rotation in opposite directions around spaced parallel axes, one of said rollers having hole forming means thereon forming holes in the surface thereof parallel to the axis of rotation thereof, cutting blades mounted on said hole forming means within the holes and having the cutting edges parallel to said axis of rotation and substantially flush with the outer surface of said one roller, and a plurality of cutting blades on the other roller contacting the cutting blades on said one roller in overlapping cutting relationship, each cutting blade on said other roller being mounted thereon in a position inclined to the axis of rotation of said other roller when said blade and roller are viewed in side elevation, and in a position skew to the axis of rotation of said other roller, and the cutting edges of said last mentioned plurality of cutting blades being curved convexly with respect to the axis of rotation, whereby when the rollers rotate, the point of contact between a blade on one roller and a blade on the other roller moves along the length of the blades from one end to the other, and a fiber bundle feeding device comprising a guiding roller above said one roller and displaced away from said one roller in a direction opposite to the direction in which said other roller is spaced from said one roller, a pushing-in roller above said guiding roller, a pivoted arm on which said pushing-in roller is mounted, a guide 16 extending from said arm around said one roller to the point immediately ahead of the point at which said cutting blades begin to overlap, and endless belt means extending around said pushing-in roller 15 and said guide 16 and running along a portion of the circumference of said one roller 4 immediately ahead of the point at which said cutting blades 7 and 10 begin to overlap, whereby the fiber bundle is guided from between said guiding roller 12 and said pushing-in roller 15 and between said belt 17 and said one roller 4 and between said cutting blades.

The advantage of this device is that it cuts the fibers in the fiber bundle in even lengths whether the bundle is wet or dry, or whether the fibers are crimped or uncrimped. The device is a light and high speed mechanism, and the wear on the device and the cutting blades thereof is kept at a minimum.

The device will now be described in connection with the accompanying drawings, in which:

FIG. 1 is a side elevation view of a portion of the device, partly in section;

FIG. 2 is a top plan view of the device of FIG. 1;

Figure 3:
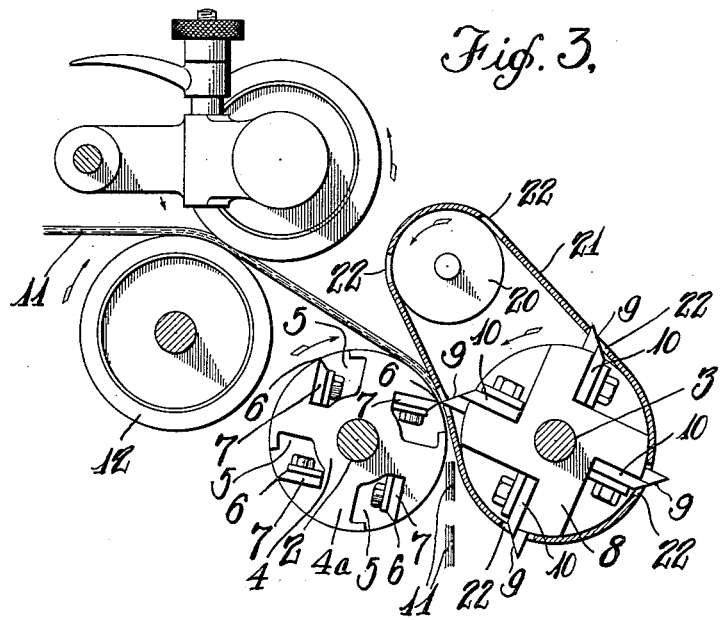
FIG. 3 is a side elevation view of a further embodiment of the device, partly in section.
Figure 4:
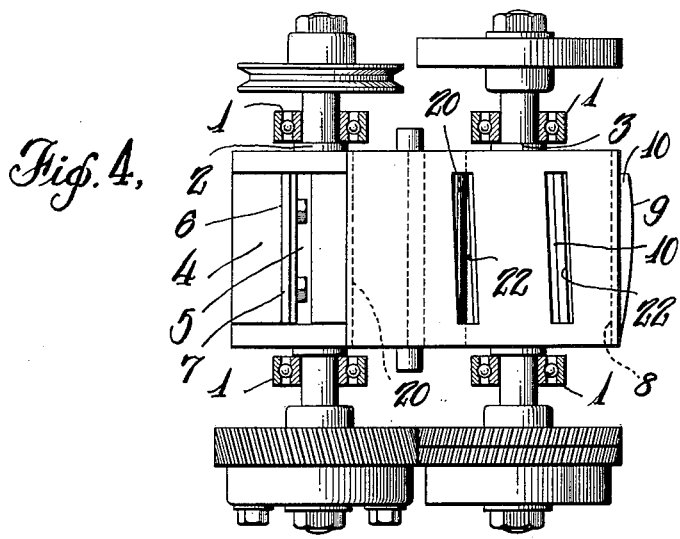
FIG. 4 is a top plan view of the device of FIG. 3.

Let us now explain a mode of application of this invention by means of figures. A rotatory cutting roller 4 is mounted on one shaft 2 of two shafts 2, 3 which are supported by bearings 1, 1 and rotate in the opposite direction to each other. Hole forming members 4a on the roller 4 define between them holes 5, 5 on the circumferential surface of the cutting roller 4 in a direction parallel to shaft 2. Mounted on hole forming members 4a within holes 4 are cutting blades 7, 7 with straight edges 6, 6 which are parallel to the shaft. Other cutting blades 10, 10 with edges 9, 9 which are convexly curved with respect to the shaft 3 are fitted to a rotary cutting roller 8 mounted on the shaft 3 in such manner that the direction of the curved edges are inclined to the shaft when viewed in side elevation and at the same time the cutting blades 10, 10 are skew. Further, the edges 6, 9 of the cutting blades 7, 10 are made to overlap each other in cutting relationship as a result of the skewness. Thus when the shafts 2, 3 rotate in the opposite direction to each other, the differences of the circumferential speed of the two cutting edges 6, 9 along their lengths causes a difference in the point of contact between the two cutting edges 6, 9, whereby the point-contact shifts gradually from one end to the other along the two cutting edges 6, 9 in accordance with the progress of rotation, and the fiber bundle put between the two rotatory cutting blades is cut by a scissors-like action at the point of contact which shifts gradually along the two rotatory cutting blades. As this scissoring action of the two rotatory cutting blades is repeated at regularly recurring intervals, the fiber bundle, whether it is dry, wet or crimped, can be cut at regular intervals. Having no undependable parts in the apparatus as described above, this device not only assures a light and high-speed cutting operation but also has an advantage of providing a long life for the machinery and the cutting blades mounted thereon.

Nextly, in connection with this device, a rotatory guiding roller 12 is placed to the rear and above the cutting roller 4, on the upper side of which a pushing-in roller 15 is placed and is supported by an arm 14 which is pivoted on a supporting shaft 13. An endless belt 17 runs around the roller 15 and a guide fitted on the lower edge of the arm 14, and the under surface of the lower run of this endless belt is made to contact the rotatory cutting roller. A fiber bundle 11 is first guided between the endless belt 17 and the rotatory guiding roller 12, then, being pinched between the circumferential surface of the rotatory cutting roller 4 and the endless belt 17 at the place where the under surface of the lower run of the endless belt makes contact with the circumferential surface of the cutting roller 4, the fiber bundle is guided to and cut between the cutting blades 7 and 10 on the cutting rollers 4 and 8.

As stated above, the fiber bundle is pinched between the under surface of the lower run of the endless belt which makes an arc-contact with the circumferential surface of the cutting roller 4 and guided to the cutting position between the cutting rollers and is properly pressed against the circumferential surface of the cutting roller.

Consequently, the fiber bundle is set free to move, and furthermore, even in case of a material such as crimped fiber, the bundle can be fed between the cutting blades of the cutting rollers while being stretched well enough for cutting. Thus, the device assures not only guiding of the fiber bundle with accuracy and at a high speed but also cutting of the fiber bundle in uniform lengths whether the material is dry, wet or crimped.

Moreover, if it is required, because of the size of the fiber bundle, to form a gap between the under surface of the lower run of the endless belt 8 and the circumferential surface of the cutting roller 4, the adjustment can be made easily by loosening a bolt 18, turning the guide 16 about its pivoting point 19 as a center, and fastening the bolt 18 again. Further, by providing a concave groove 19' in the center of the part where the guide 16 contacts the endless belt, it becomes possible for the guide 16 and the endless belt to make an escape feeding to the said concave groove 19' if there is a partial lump of fiber in the center of the bundle, and thus the fiber bundle can be fed smoothly. It is, of course, possible to make the endless belt run more quickly by changing the edge of the guide 16 on which the endless belt 17 is guided from a fixed member to a rotatable one.

Lastly, the above stated fiber bundle feeding device can be changed as follows. An endless belt 21 is placed around a cylindrical cutting roller 8 and a guiding roller 20 which is above and offset from the former. The endless belt 21 has holes 22 cut in it through which the edges of the cutting blades 10 on the cutting roller 8 can project, and a part of the back of the endless belt 21 contacts the circumferential surface of the rotatory cutting roller.

The fiber bundle 11 is pressed and pinched between the part of the back of the endless belt 2 which extends between the cutting roller 8 and the guiding roller 20 and the circumferential surface of the cutting roller 4, and it is guided to and cut at the point of contact between the cutting blade 7 on the cutting roller 4 and the rotatory cutting blade 10. Thus, the device assures that the fiber bundle is not free to move and that it is cut in the desirable lengths. Particularly, in case of feeding a crimped fiber, it will always be cut in uniform lengths.

What is claimed is:

1. A transversely severing fiber cutting device comprising a pair of adjacent rollers mounted for rotation in opposite directions around spaced parallel axes, one of said rollers having hole forming means thereon forming holes in the surface thereof parallel to the axis of rotation thereof, cutting blades mounted on said hole forming means within the holes and having the cutting edges parallel to said axis of rotation and substantially flush with the outer surface of said one roller, and a plurality of cutting blades on the other roller contacting the cutting blades on said one roller in overlapping cutting relationship, each cutting blade on said other roller being mounted thereon in a position inclined to the axis of rotation of said other roller when said blade and roller are viewed in side elevation, and in a position skew to the axis of rotation of said other roller, and the cutting edges of said last mentioned plurality of cutting blades being curved convexly with respect to the axis of rotation, whereby when the rollers rotate, the point of contact between a blade on one roller and a blade on the other roller moves along the length of the blades from one end to the other, and a fiber bundle feeding device comprising a guiding roller above said one roller and displaced away from said one roller in a direction opposite to the direction in which said other roller is spaced from said one roller, a pushing-in roller above said guiding roller, a pivoted arm on which said pushing-in roller is mounted, a guide extending from said arm around said one roller to the point immediately ahead of the point at which said cutting blades begin to overlap, and endless belt means extending around said pushing-in roller and said guide and running along a portion of the circumference of said one roller immediately ahead of the point at which said cutting blades begin to overlap, whereby the fiber bundle is guided from between said guiding roller and said pushing-in roller and between said belt and said one roller and between said cutting blades.

2. A fiber cutting device as claimed in claim 1 in which said guide member is adjustably mounted on said arm for moving said guide member toward and away from said one roller.

3. A fiber cutting device as claimed in claim 1 in which said guide member has a concave depression therein along the width thereof parallel to said one roller and concave with respect to said one roller.

4. A fiber cutting device as claimed in claim 1 in which said guiding arm has a roller on the end thereof around which said belt means runs.

References Cited in the file of this patent

UNITED STATES PATENTS

| | | |
|---|---|---|
| 2,221,022 | Ellis | Nov. 12, 1940 |
| 2,233,922 | Kaddeland | Mar. 4, 1941 |
| 2,246,957 | Shields | June 24, 1941 |
| 2,291,841 | Staude | Aug. 4, 1942 |
| 2,478,240 | Christman | Aug. 9, 1949 |
| 2,711,957 | McFall | June 28, 1955 |
| 2,821,253 | Heffelfinger et al. | Jan. 28, 1958 |
| 2,829,691 | Jarvis | Apr. 8, 1958 |
| 3,008,364 | Stobb | Nov. 14, 1961 |

FOREIGN PATENTS

| | | |
|---|---|---|
| 722,432 | Germany | July 9, 1942 |